Figure 1:
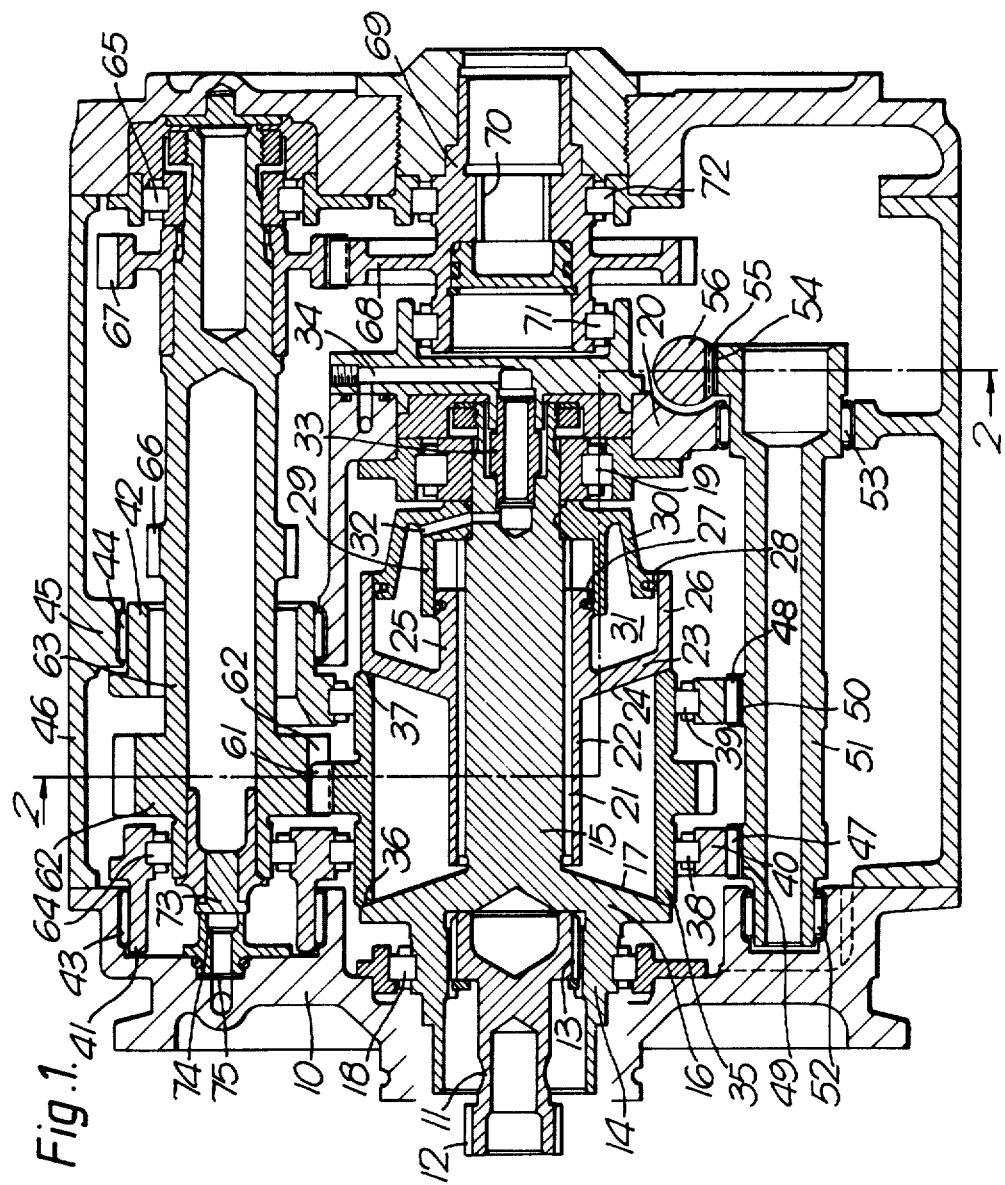

United States Patent [19]

Colley

[11] 4,310,768

[45] Jan. 12, 1982

[54] CONSTANT SPEED DRIVE

[75] Inventor: Rowan H. Colley, Sunnyhill, England

[73] Assignee: Rolls-Royce Limited, London, England

[21] Appl. No.: 136,401

[22] Filed: Apr. 1, 1980

[30] Foreign Application Priority Data

Apr. 21, 1979 [GB] United Kingdom .............. 13959/79

[51] Int. Cl.³ .................... F16H 15/22; H02K 7/10; H02P 9/04
[52] U.S. Cl. .................................. 290/1 C; 74/196; 310/83
[58] Field of Search ................................ 74/190-193, 74/212, 196; 310/83, 191; 290/1 C

[56] References Cited

U.S. PATENT DOCUMENTS

| | | | |
|---|---|---|---|
| 644,591 | 3/1900 | Freeman | 310/83 |
| 849,051 | 4/1907 | Churchward | 74/196 |
| 911,947 | 2/1909 | Davis | 74/190 |
| 1,203,992 | 11/1916 | Ennis | 74/190.5 |
| 1,737,295 | 11/1929 | Bronander | 310/83 |
| 2,815,670 | 12/1957 | Jorgensen | 74/191 |

FOREIGN PATENT DOCUMENTS 356662 3/1930 United Kingdom .
1392440 4/1975 United Kingdom .................. 74/190

*Primary Examiner*—J. V. Truhe
*Assistant Examiner*—Shelley Wade
*Attorney, Agent, or Firm*—Cushman, Darby & Cushman

[57] ABSTRACT

A constant speed drive comprises a frictional variable speed drive controlled by a control system to produce a constant output speed. The drive includes a rotatable disc having a frusto-conical surface and being urged into frictional engagement with a rotatable annulus having a corresponding frustoconical edge, the annulus and disc being relatively movable between a position in which they are coaxial and provide a unity drive ratio and a position in which they are eccentric and provide a different drive ratio determined by the relative positions of their axes. Actuation means are provided for adjusting the positions of the axes of the annulus and disc relative to one another, and the control system controls the actuation means to vary the relative positions of the axes of the disc and annulus and thus the drive ratio to maintain a sensibly constant output speed.

8 Claims, 4 Drawing Figures

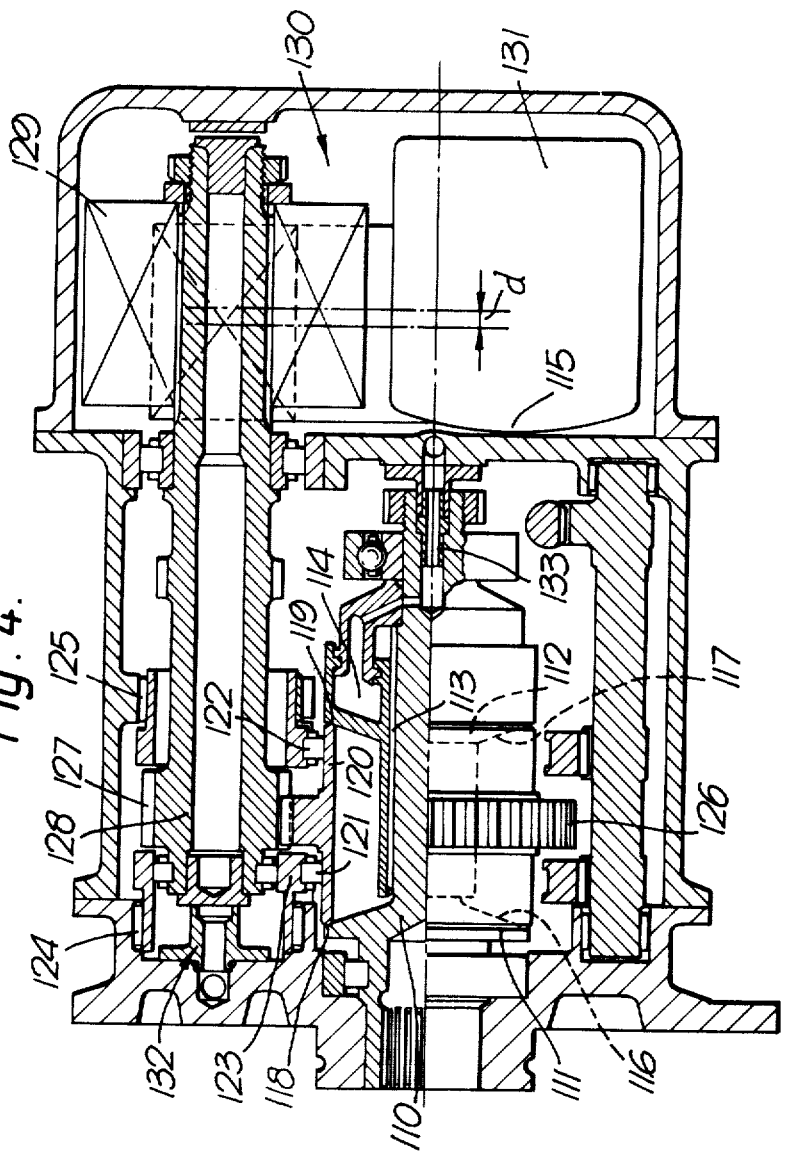

CONSTANT SPEED DRIVE

This invention relates to a constant speed drive.

In various applications, particularly the drive of accessories such as alternators from a gas turbine engine, it is necessary to provide a drive whose output is at sensibly constant speed despite variations of the input speed over a certain range. Such drives in the past have mainly used hydraulic systems, and have tended to be heavy and expensive.

The present invention provides a constant speed drive which may be relatively simple and cheap.

According to the present invention a constant speed drive comprises a variable ratio drive transmission including a rotatable disc having a frusto-conical surface and being urged into frictional engagement with a rotatable annulus having a correspondingly frusto-conical edge, the annulus and disc being relatively moveable between a position in which they are coaxial and provide a unity drive ratio and a position in which they are eccentric and provide a different drive ratio determined by the relative positions of their axes, actuation means for adjusting the positions of the axes of said annulus and disc relative to one another and a control system for controlling said actuation means to vary the relative positions of the axes of the disc and annulus and thus the drive ratio to maintain a sensibly constant output speed.

There may be two said discs with facing frusto-conical faces between which the annulus engages, the discs being urged together to provide frictional drive between the discs and the annulus.

There may be a controlled force causing the frictional drive members to come into engagement and this force is preferably just sufficient to ensure engagement at all operating conditions. Thus it may be particularly advantageous to vary this load in accordance with a parameter such as output torque.

One way of carrying this out is to apply loading fluid pressure to one or more of said discs or said annulus which is allowed to slide axially. In this case the pressure of the loading fluid may be generated by a pump driven from the constant speed drive and controlled by a spill-valve operated in accordance with the end-load produced by helical gears transmitting the output of the drive.

Alternatively or in addition the spill-valve may be operated in accordance with magnetic loads in a generator driven by the constant speed drive, the loads being proportional to the torque output.

If helical gears are used in the drive, the loading fluid pressure may be used to offset at least some of the end-load on the driving shaft.

Preferably the control system for the relative positions of the disc and annulus axes is such as to prevent overspeeding if loss of loading pressure or pressure used to vary the positions of the axes occurs. One way of carrying this out is to balance the control pressure against the loading pressure in a cylinder used to vary said positions; in this case a loss of control pressure is arranged to cause the axes to move to their lowest ratio position, while a loss in loading pressure will in any case cause the frictional drive to disengage.

Figure 2:
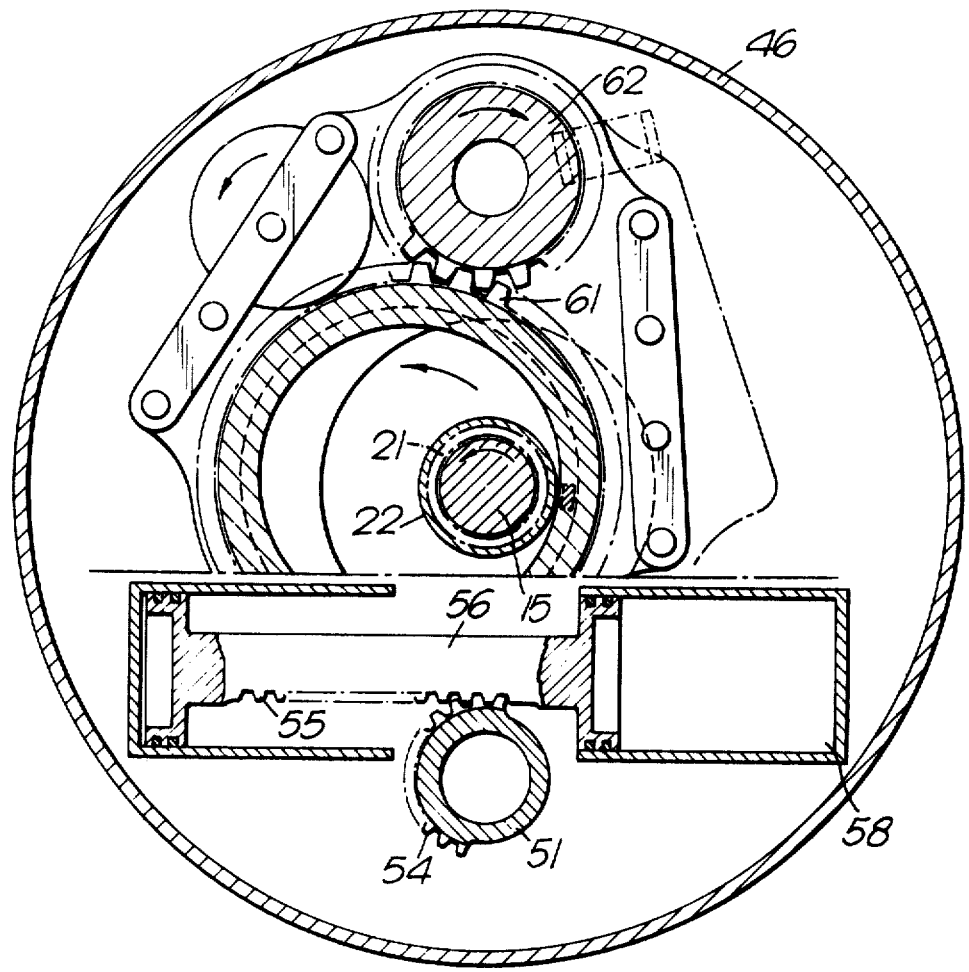
Figure 3:
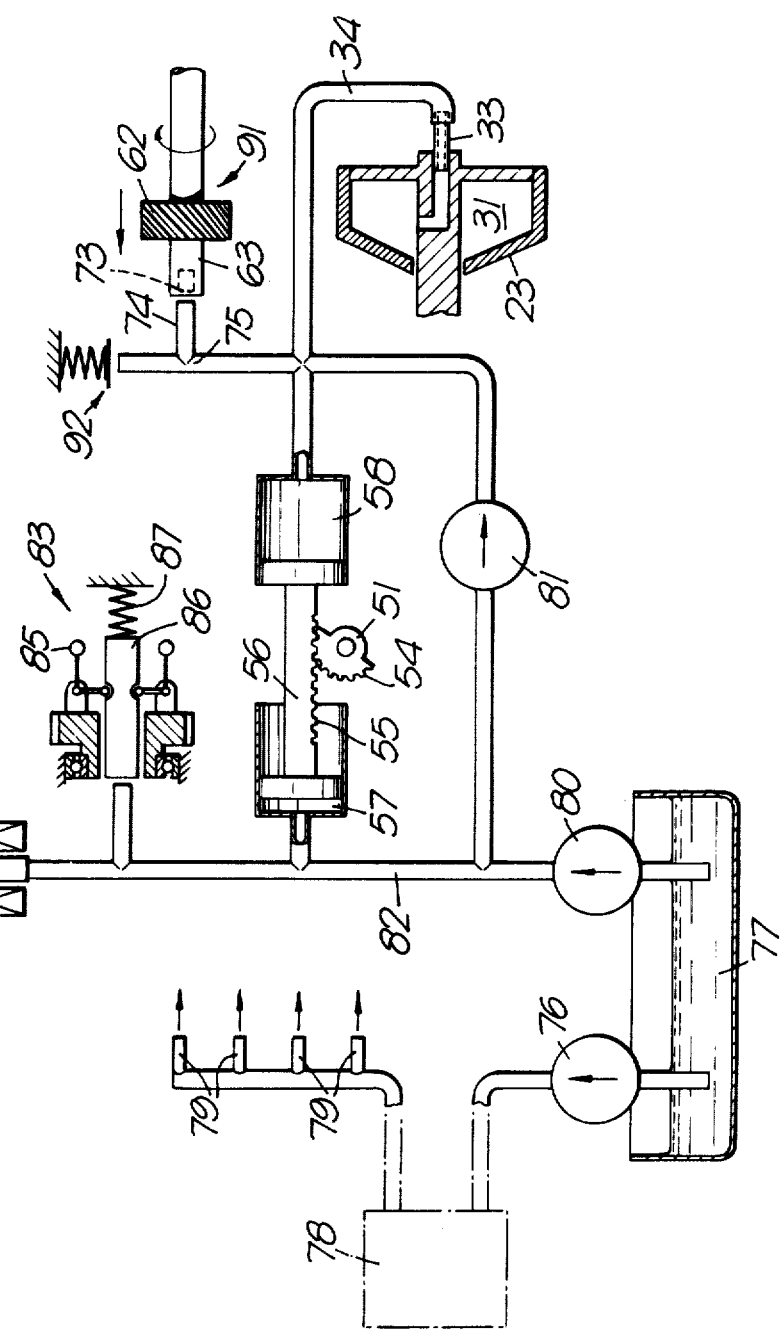

The invention will now be particularly described, merely by way of example, with reference to the accompanying drawings in which;

FIG. 1 is a longitudinal section through the mechanical part of a drive in accordance with the present invention, FIG. 2 is a section on the line 2—2 of FIG. 1, FIG. 3 is a diagram of the control and lubrication oil system of the FIG. 1 drive, and FIG. 4 is a view similar to FIG. 1 but of a second embodiment.

The drive unit of FIG. 1 has an interface piece 10 which forms part of the casing of the unit and is arranged to be attached to the power source (in the present case this is a gas turbine engine). An input drive spindle 11 is connected via splines 12 to the power source, and at its other extremity further splines 13 engage with a hollow primary shaft extension 14. The shaft extension 14 forms a projection from the primary shaft 15 which carries a first drive disc 16. It will be seen that the disc 16 has a frusto-conical face 17 facing to the right of the housing, and this face of the disc will in fact be of hardened steel.

The primary shaft 15 is mounted for rotation in a first roller bearing 18 carried from the interface piece 10, and a second roller bearing 19 carried from a static diaphragm structure 20. On the outer surface of the shaft 15 a straight splined coupling 21 carries a hollow secondary shaft portion 22. This secondary shaft portion carries a second drive disc 23 which, like the disc 16, has a frusto-conical face 24 of hardened steel. The faces 17 and 24 are opposed but identical, and by virtue of the splined coupling 21 the disc 23 may be moved closer to or further away from the disc 16.

The rearward (right hand in the drawing) face of the disc 23 is provided with inner and outer axially extending annular flanges 25 and 26 respectively. These flanges seal through external and internal piston seals 27 and 28 with corresponding annular flanges 29 and 30 respectively, carried from and rotating with the primary shaft 15. The four flanges thus define a sealed space 31, and an inlet duct 32 to the space 31 allows pressurised fluid to be fed to the space 31 and thus to urge the disc 23 toward the disc 17.

Pressurised fluid may be fed to the duct 32 via a floating feed tube 33 mounted coaxially within the extremity of the shaft 15. This tube also performs a balancing function for end-load on the shaft 15 as described below. Feed to the tube 33 is through passages 34 connected to a control system described below with reference to FIG. 3.

The disc 23 may thus be urged toward the disc 16 under the influence of a controlled pressure within the space 31, and between the faces 17 and 24 is engaged an annulus 35. This annulus is shown in FIG. 1 as being coaxial with the discs 16 and 23, and it has annular end faces 36 and 37 which, in the position shown, engage with the entire annular edge regions of the respective faces 17 and 24.

The drive from the input shaft 11 will therefore be transmitted through the shaft 15 and the discs 16 and 23 to the annulus 35 by frictional engagement between the faces 17 and 24 and 36 and 37. When the annulus is coaxial with the discs as in the position shown in FIG. 1, the drive is transmitted at a unity ratio. However, it will be understood that if the annulus is translated so that its axis remains parallel to but distant from the disc axis, engagement between the discs and the annulus alters from being completely round the faces of the annulus to being at one point (or contact patch) only of the annulus. The splined joint 21 will allow the disc 23 to move away from the disc 16 to accommodate the annulus, while the fluid pressure in the space 31 will ensure that the load on the contact patch is sufficient to ensure the necessary frictional engagement.

Under these conditions the radius of the points on the frusto-conical faces 17 and 24 is different from that of the annulus. Therefore the annulus will rotate at a slower speed than the discs, and a ratio of less than unity is provided. Clearly the amount of the reduction ratio will depend upon the distance between the axes of the discs and the annulus.

In order to enable the annulus axis to be moved relative to the axis of the discs, the annulus is supported for rotation in roller bearings 38 and 39 in a yoke 40. The yoke 40 carries the bearings and thus the annulus in its lower portion, while its upper portion has a pair of cylindrical end flanges 41 and 42 which are carried in needle roller bearings 43 and 44 respectively from the cast interface 10 and from a diaphragm 45 which is integral with the main casing 46 of the unit. The yoke 40 may therefore swing in the bearings 43 and 44 about an axis arranged to be parallel with that of the shaft 15. Hence the lower portion of the yoke which carries the annulus may move to position the annulus axis at a position on the arc of a circle struck about the axis of the bearings 43 and 44, i.e. the annulus axis may be moved toward or away from the axis of the shaft 15 as required.

In order to move the yoke 40 about its bearings, and to hold it in its correct position, the lower portion of the yoke has two arcuate racks of helical gear teeth 47 and 48 on its lowermost periphery centred on the axis of motion of the yoke. These racks engage with corresponding helical racks 49 and 50 formed on a control shaft 51 which is mounted in bearings 52 and 53 to be rotatable about an axis parallel with that of the bearings 43 and 44 and the shaft 15.

The engagements between the racks 47, 48 and 49 and 50 therefore hold the yoke in position, and by rotating the shaft 51 the yoke may be moved about its bearings. To allow rotation of the control shaft 51 it is provided at its extremity, overhung from the bearing 53, with a straight-toothed pinion 54. This is engaged by a straight rack 55 formed on a piston rod 56 which moves under the influence of two opposed piston-and-cylinder arrangements 57 and 58. Each of these is provided with a controlled fluid pressure through the inlet ducts 59 and 60 from the control circuit to be described below.

It will be seen therefore that the pressures of fluid supplied to the pistons and cylinders 57 and 58 will determine the angle of the control shaft 51, hence the position of the yoke 40 and the ratio between the discs 17 and 23 and the annulus 35.

To take the drive from the annulus 45, the annulus has a helical ring gear 61 formed on its cylindrical outer surface. This gear engages with a corresponding helical gear 62 formed on a layshaft 63 which is carried in roller bearings 64 and 65 which are concentric with the needle roller bearings 43 and 44. The layshaft has two output gears formed on it; a worm drive gear 66 which is intended to drive oil pumps for lubrication and control purposes, and a straight-toothed output gear 67. The gear 67 serves two purposes. It drives an overspeed governor (see FIG. 3), but its main purpose is to drive the main output. Thus the output gear 67 engages with the straight toothed main output gear 68 to give a further reduction in speed ratio, and the main output gear 68 forms part of the output shaft 69 having splines 70 to which the device to be driven, such as the alternator, may be directly coupled or which may in turn drive a further shaft. Bearings 71 and 72 support the shaft 69 and hence the gear 68.

The layshaft 63 is used to fulfill another purpose, in that at its left-hand extremity it has a valve member 73 which co-operates with a valve seat 74 to control pressure in a duct 75. The axial force exerted by the shaft 63 to close the valve member 73 on the seat 74 is generated by the helical gears 61 and 62, and is thus proportional to the torque being passed through the gear train and thus the output torque of the device. The pressure in the duct 75 can thus be dependent upon this torque, and this pressure forms part of the hydraulic system of the unit described below with reference to FIG. 3.

It will be seen that three pumps are provided, all pumps in this case using lubricating oil as their operating fluid. A lubrication pump 76 pumps oil from a sump 77 through an oil cooler 78 to a series of lubrication jets 79; this circuit forms a completely separate lubrication system for the bearings etc of the unit. A second circuit is initiated by the control pump 80 which takes oil from the sump 77 and delivers part to the load pump 81 and part to the duct 82 of the control circuit. In the control circuit the pressure of fluid in the duct 82 is controlled by an overspeed governor 83 and a speed control valve 84. The purpose of the overspeed governor is to provide a simple inbuilt device able to prevent gross, disastrous overspeed of the output, in the event that malfunction of the speed control system should cause a very high speed to be selected.

The governor 83 is a simple bob-weight device in which weights 85 centrifuge outward if the speed of the output exceeds a predetermined limit, moving the valve member 86 against the pressure of the spring 87 and hence reducing the pressure in the duct 82. As explained below, this will reduce the gear ratio and hence the output speed.

The speed control valve 84 is a solenoid operated valve which is supplied with its operating signal from a frequency detector unit 88 which samples the frequency of output of the alternator 89. If the frequency is too high, the valve 84 opens reducing the pressure in the duct 82, while if it is too low the valve closes thus increasing the duct pressure.

It will be seen that if the pressure in the piston-and-cylinder 58 remains constant, an increase in the pressure in line 82 from an equilibrium value will cause the piston rod 56 to move to the right as shown in FIGS. 2 and 3. This will rotate the control shaft 51 to move the yoke 40 nearer to being coaxial with the discs and shaft 15, and hence the ratio of the drive will increase. The speed of the output will thus increase. Conversely, a reduction in the pressure in the duct 82 will cause the output speed to decrease.

Turning now to the load circuit, the load pump 81 delivers oil to a duct 90 which feeds the piston-and-cylinder 58 and the space 31 and is controlled by the load control valve 91 made up of the seat 74 and valve member 73, and the overload limiter valve 92. The limiter 92 is simply a spring-loaded relief valve which will open if the pressure becomes excessive, while as explained above the load control valve will control the pressure in the duct 75 and hence the duct 90 to be proportional to the output torque.

The pressure in the duct 90 is mainly used in the space 31 to load the disc 23 against the annulus 35. In this way the contact pressure between the discs and the annulus is maintained at a level sufficient to transmit the power requirement but not so great as to increase unduly the losses at the contact patch.

It will also be seen that the pressure acts on the end of the shaft 15 and because of the floating sleeve 33, it pushes the shaft to the left. It can be arranged that the area of the seal between the sleeve and the shaft is sufficient for the force produced to exactly counterbalance the end load applied by the helical gears 61 and 62.

Since this end load, like the pressure in the duct 90, is proportional to the transmitted torque, these forces can be arranged to balance out at all drive conditions. However, in addition to this use the pressure is also applied to the piston-and-cylinder 58 to counterbalance the control pressure used in the oposed device 57.

This counterbalancing technique has two purposes. Firstly, it provides a fail-safe control system; thus if the control pressure is lost, the load pressure will move the piston rod to reduce the gear ratio and hence the speed of the output. If the load pressure is lost, the control pressure will move the piston rod to increase the gear ratio and thus the output speed, but at the same time the loss of load pressure will allow the disc 23 to retract and thus to disconnect the drive altogether. There is thus no likely situation which will end up with a gross overspeed of the output and possible bursting of alternator rotors etc.

The second purpose of using the counterbalanced pistons and cylinders 57 and 58 is to reduce the capacity of oil pumps required for the system. It will be seen that as oil goes into the piston and cylinder 57 it leaves 58; therefore the pumps 80 and 81 need only supply the oil equivalent to leakage plus the difference in displacement, and because of this the pumps can be very small, absorbing very little power.

It will be seen that the unit described above with reference to FIGS. 1-3 is a relatively simple, compact and efficient device; indeed we calculate that the unit may be some 10% more efficient and about half the size of currently available alternative drives using hydraulic systems. FIG. 4 shows a further simplified device which has an alternator integrated with the drive and assisting in the control of the device.

The basic elements of the FIG. 4 device are similar to those of FIG. 1. Thus there is a main input shaft 110 taking drive to first disc 111 fixed on the shaft and a second disc 112 which rotates with the shaft but can slide axially by virtue of the splined connection 113. The disc 112 has a sealed space 114 at its rear face to which a load pressure may be fed from a duct 115.

The load pressure clamps the frustoconical drive faces 116 and 117 of discs against the correspondingly shaped edges 118 and 119 of an annulus 120 mounted for rotation in bearings 121 and 122 in a yoke 123 which can swing about bearings 123 and 125. Thus for the arrangement will be recognised as being virtually identical to that of the FIG. 1 device. However, instead of the annulus 120 carrying a helical drive gear like 61 of FIG. 1, it has a straight-toothed external gear 126 round its periphery which engages with the correspondingly straight-toothed gear 127 on the shaft 128, which in this instance is not a layshaft but becomes the main output shaft of the unit. Indeed the shaft carries at its extremity remote from the gear 127, the rotor 129 of an alternator generally indicated at 130.

Because the gears 126 and 127 are straight and form the sole geared engagement in the main drive, there is no end-load either on the shaft 110 or on the shaft 128. It is therefore necessary to provide some other form of output torque sensitive arrangement to give the effect of the valve 91 of the previous embodiment. This is done in the present case by axially off-setting the rotor 129 of the alternator 130 from its stator 131 by an amount 'd'. When the unit is running there will be an axial magnetic force proportional to the power being generated, which will act on the shaft 128. The shaft will then be able to operate a valve 132 which will be seen to be very similar to the valve 91 and will have the same effect of controlling the load pressure in accordance with output.

Although in the case described the teeth of the gears 126 and 127 are straight, it will of course be possible to use helical gears in which ase the axial magnetic load will be used to supplement the end load due to the gears. In this case it will also be useful to provide a floating tube 133 similar to the tube 33 to allow the load pressure to balance the loads on the input shaft 110.

The FIG. 4 device is thus even more compact that the previous embodiment, and it is very suitable for use with gas turbine aero engines of relatively low power such as may be used for business aircraft and the like.

It should be understood that there are various modifications which could be made to the devices as described above. Thus one major modification which is clearly feasible would be to reverse the drive through the disc and annulus and taking the output from the discs, but otherwise the system would be basically similar to that described. A second modification would involve the use of a single disc rather than the pair described. Problems would be experienced with load balancing etc because this would not be such a symmetrical system, but there is no theoretical reason why a single disc arrangement should not work.

It shall also be noted that the devices described represent sophisticated applications of the basic drive unit. Clearly such refinements as the closely controlled hydraulic load on the discs and the hydraulic speed control could be replaced by simpler alternatives such as springs, and mechanical controls.

I claim:

1. A constant speed drive comprising a variable ratio drive transmission including two spaced rotatable discs having facing frusto-conical surfaces and having a common axis, a rotatable annulus having an axis parallel to the axis of said discs and having opposite facing frusto-conical edges respectively engaging the frusto-conical surfaces of said discs, hydraulically actuated loading means for urging said discs toward one another to provide a frictional drive between said discs and said annulus in accordance with torque of the drive, actuation means for moving said annulus relative to said discs between a position in which the axis of said annulus is coaxial with the axis of said disc to provide a unity drive ratio and a position in which the axis of said annulus is still parallel to but spaced from the axis of said discs to provide a different ratio determined by spacing between the axes, and a hydraulic control means for controlling said actuation means to vary the relative positions of the axes of said discs and annulus and thus the drive ratio to maintain a sensibly constant output speed, said hydraulic control means being operated in accordance with output of said drive, said hydraulic control means coacting with said hydraulically actuated loading means to provide a compensating effect between the output of a particular drive ratio and the frictional drive between said discs and annulus.

2. A constant speed drive as claimed in claim 1 and in which loading means comprises an hydraulic fluid pressure operated piston and cylinder arrangement, the pressure of the hydraulic fluid being controlled by a spill valve operated in accordance with the torque transmitted by the drive.

3. A constant speed drive as claimed in claim 2 and comprising an alternator connected to an output shaft of the drive, the alternator rotor and stator being axially offset to produce an end-load on the shaft proportional to the electrical output of the alternator and the end-load on the shaft being transmitted to said spill valve to cause it to control the hydraulic pressure in accordance with the electrical output of the alternator and hence the power carried by the drive.

4. A constant speed drive comprising a variable ratio drive transmission including two rotatable discs having facing frusto-conical surfaces urged into frictional engagement with correspondingly frusto-conical edges of a rotatable annulus, said annulus and said discs being relatively movable between a position in which they are coaxial and provide a unity drive ratio and a position in which they are eccentric and provide a different drive ratio determined by the relative position of their axes, loading means for urging said discs together to provide frictional drive between the discs and the annulus, said loading means providing a force which varies in accordance with torque transmitted by the drive and includes a hydraulic fluid pressure operated piston and cylinder arrangement, pressure of hydraulic fluid being controlled by a spill valve, a pair of mating helical gears through which the drive is taken, an axial load on one of said gears being transmitted to said spill valve to cause the spill valve to control the hydraulic pressure in accordance with the axial load and hence the torque, actuation means for adjusting relative positions of the axes of said annulus and said discs to provide different drive ratios, and a control system for controlling said actuation means to vary the relative positions of the axes of the annulus and discs and thus the drive ratio to maintain a sensibly constant output speed.

5. A constant speed drive as claimed in claim 4 and in which one said helical gear is formed on the outer surface of said annulus, and said discs are carried on a shaft, compensating means being provided in which said hydraulic pressure is applied to produce an axial load on said shaft which offsets the axial load due to the helical gear.

6. A constant speed drive comprising a variable ratio drive transmission including two rotatable discs having facing frusto-conical surfaces urged into frictional engagement with corresponding frusto-conical edges of a rotatable annulus, said annulus and said discs relatively movable between a position in which they are coaxial and provide a unity drive ratio and a position in which they are eccentric and provide a different drive ratio determined by the relative position of their axes, a hydraulically actuated loading means for urging said discs together to provide frictional drive between the discs and the annulus, said loading means including a first spill valve operated in accordance with torque transmitted by said drive for providing a force which varies in accordance with torque transmitted by the drive, actuation means for adjusting the positions of the axes of said annulus and said discs relative to one another, a hydraulically actuated control system for controlling said actuation means to vary the relative position of the axes of the annulus and discs and thus the drive ratio to maintain a sensibly constant output speed, and a double-opposed piston and cylinder arrangement in which hydraulic pressure of said control system opposes hydraulic pressure of said loading means.

7. A constant speed drive as claimed in any of claims 4, 3 or 6 and in which there is a bob-weight governor driven from an output of the drive and operating a second spill valve in such a way as to reduce the actuating pressure should the drive output overspeed and thus to reduce the gear ratio of the drive.

8. A constant speed drive as claimed in claim 6 and in which there is an alternator driven from the drive, and a second spill valve operated by a frequency detector circuit to maintain the frequency of the output of the alternator at a constant value by varying the ratio of the drive.

* * * * *